United States Patent [19]

Sakano et al.

[11] 4,290,395
[45] Sep. 22, 1981

[54] BALANCING DEVICE FOR AN ENGINE

[75] Inventors: Kenji Sakano; Masahiro Yamashita; Kenji Yamashita; Masahiro Aketa, all of Osaka, Japan

[73] Assignee: Kubota Ltd., Osaka, Japan

[21] Appl. No.: 75,411

[22] Filed: Sep. 14, 1979

[30] Foreign Application Priority Data

Oct. 12, 1978 [JP] Japan .................. 53/126008

[51] Int. Cl.³ ............................................. F02B 75/06
[52] U.S. Cl. ...................... 123/192 B; 123/192 B;192
[58] Field of Search ........................... 123/192 B, 192

[56] References Cited

U.S. PATENT DOCUMENTS

| 1,163,832 | 12/1915 | Lanchester | 123/192 B |
| 2,807,249 | 9/1957 | Peras | 123/192 B |
| 2,914,137 | 11/1959 | Sykes, Jr. | 123/192 B X |
| 3,402,707 | 9/1968 | Heron | 123/192 B |
| 3,511,110 | 5/1970 | Grieve | 123/192 B |

FOREIGN PATENT DOCUMENTS

| 976822 | 10/1975 | Canada | 123/192 B |
| 722783 | 1/1955 | United Kingdom | 123/192 B |
| 844071 | 8/1960 | United Kingdom | 123/192 B |

Primary Examiner—Wendell E. Burns
Attorney, Agent, or Firm—Bacon & Thomas

[57] ABSTRACT

A balancing device comprising three or more rotating balancers mounted within a housing is detachably mounted on a reciprocating, internal combustion engine. The balancing device generates a balancing force $\vec{F_b}$ chosen to cancel the vibrating force $\vec{F_r}$ produced by the engine. The vibrating force $\vec{F_r}$ lies on a vibration line S, and the balancing force $\vec{F_b}$ is spaced a distance l therefrom, whereby a rotating moment $\vec{M}$ is generated. The balancing device also generates a balancing moment $-\vec{M}$, chosen to cancel the rotating moment $\vec{M}$.

8 Claims, 12 Drawing Figures

BALANCING DEVICE FOR AN ENGINE

TECHNICAL FIELD OF THE INVENTION

This invention relates generally to a balancing device for attaching to a reciprocating piston, internal combustion engine for counteracting vibration forces generated by operation of the engine. More particularly, it relates to an improved balancing device so designed and constructed that it can be attached to substantially any location on the engine, and effective to cancel the dominant nth harmonic component of the vibration force.

BACKGROUND OF THE INVENTION

When reciprocating piston, internal combustion engines are operated, they will inherently generate vibrations originating from the centerline of the engine crankshaft and oriented along a vibration line which passes through said centerline. The vibrating force $\vec{F_r}$ generated by an engine and transmitted from the crankshaft can be annoying and disruptive, and thus efforts have been made to counteract it and the vibrations resulting therefrom.

Balancing devices are known in the art which can be attached to an engine, and which will generate a balancing force $\vec{F_b}$ to oppose the vibrating force $\vec{F_r}$. However, in previous balancing devices it has been necessary to locate the device in a position on the engine wherein the balancing force $\vec{F_b}$ generated by the device is aligned with the vibration line S and the point O on the centerline of the crankshaft from which the vibrations emanate. This has severely limited the locational choices for known balancing devices, and has caused engines to which they are attached to be unusually bulky and to have unacceptable large cross sections in the vicinity of where the balancing devices are mounted.

A principal reason prior balancing devices have been limited to mounting locations on the vibration line S of the engine is that if located a distance l away from such vibration line S, their operation will generate a rotating moment $\vec{M}$ which will then create a further undesirable operating condition.

There is need for a new concept in balancing devices for internal combustion engines, one which does not have the locational limitations of known devices. Specifically, there is need for a new balancing device which can be located in substantially any position on the engine, so that unused empty spaces found about the typical engine can be utilized and engine size and weight can be held to a minimum. The present invention is intended to fill this need.

BRIEF SUMMARY OF THE INVENTION

The balancing device of the present invention is designed and arranged so that it can be located at substantially any desired position on an internal combustion engine. The device of the invention generates a balancing force $\vec{F_b}$, and can be located a distance l from the engine vibration line S. Any rotating moment $\vec{M}$ generated because the balancing device of the invention is spaced from the vibration line S is canceled by a balancing moment $-\vec{M}$, also generated by the present balancing device. By designing the balancing device in accordance with the principles of the invention, smooth engine operation is assured. Moreover, engine dimensions can be minimized.

The balancing device of the invention is driven from the crankshaft of the engine, to assure synchronous operating thereof with the engine's reciprocating pistons and rotating crankshaft. The device includes three or more rotating balancers, arranged to rotate about axes that are disposed parallel to each other, and parallel to the central axis of the engine crankshaft. One of the three balancers rotates in a direction opposite to the direction of rotation of the other two, and all are driven simultaneously from the engine crankshaft. The arrangement is such that the balancing device will generate a balancing force $\vec{F_b}$ which cancels out the nth harmonic component of the vibrating force $\vec{F_r}$, and a balancing moment force $-\vec{M}$ which cancels out a rotating moment $\vec{M}$ generated by having the balancing device spaced a distance l from the vibration line S.

The typical vibrating force $\vec{F_r}$ will have a number n of harmonic components, but usually one of these components will tend to dominate. The present balancing device is constructed to cancel out the dominant nth harmonic of the vibrating force $\vec{F_r}$. This will usually be sufficient to assure smooth engine operation.

It is the principal object of the present invention to provide an improved engine balancing unit for counteracting the vibrating force $\vec{F_r}$ generated by an internal combustion engine.

Another object is to provide an engine balancing device which can be mounted at substantially any location on an engine.

A further object is to provide an engine balancing device which generates both a balancing force $\vec{F_b}$ for canceling the vibrating force $\vec{F_r}$ generated by an engine, and a balancing moment force $-\vec{M}$ for canceling any moment force $\vec{M}$ generated by spacing the balancing device away from the vibration line S of the engine.

It is also an object to provide an engine balancing device which can be economically manufactured and installed on an engine, and which is dependable in use.

Other objects and many of the attendant advantages of the invention will become apparent from the following description of the preferred embodiments, when taken in conjunction with the accompanying drawings.

BRIEF DESCRIPTION OF THE DRAWINGS

With respect to the attached drawings.

DETAILED DESCRIPTION OF THE PREFERRED EMBODIMENT

The balancing device of the invention is so designed and arranged as to cancel the nth harmonic component of vibrating forces generated by an internal combustion engine, without generating any net rotating moment. The device can be attached as a unit to substantially any position on the engine, spaced away from the vibration line S which passes through the vibration origin point O on the centerline of the engine crankshaft.

Figure 12:
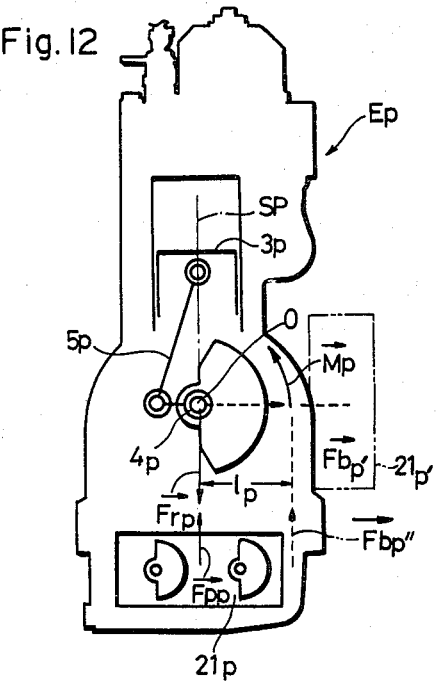
FIG. 12 is a diagrammatic, cross-sectional front view of an engine similar to FIG. 1, but showing mounted thereon a typical balancing device of the prior art.
Figure 2:
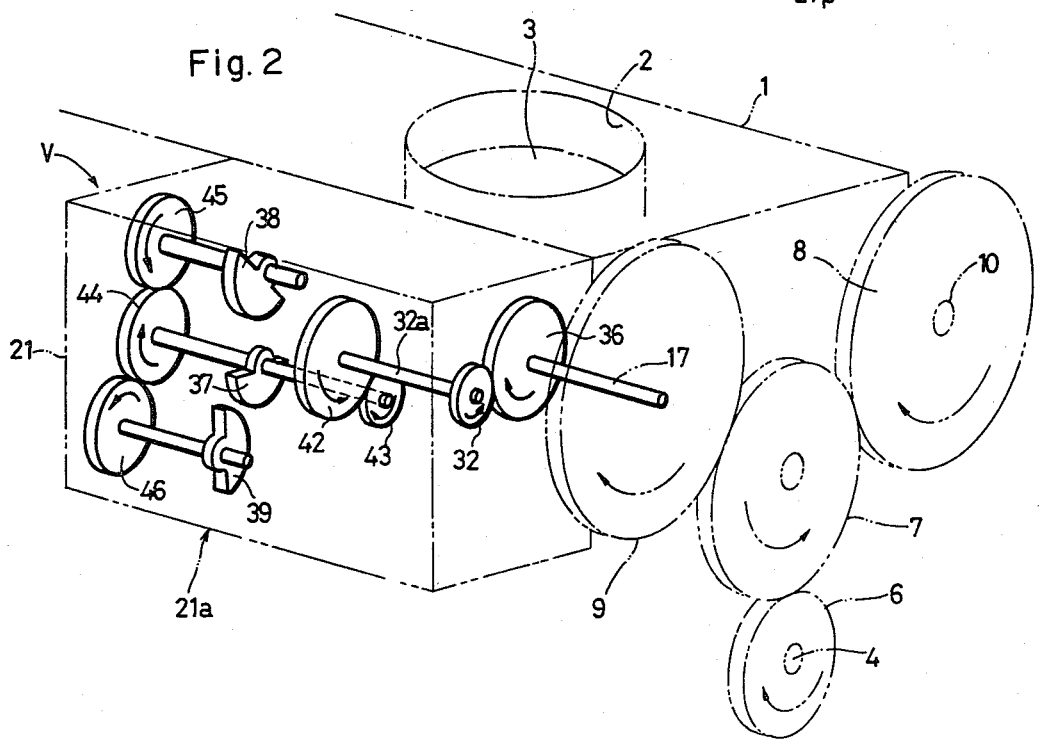
FIG. 2 is a partial, diagrammatic perspective view of the balancing device of FIG. 1, showing the three parallel, rotating balancers, and the gear arrangement for driving such from the crankshaft of the engine.
Figure 3:
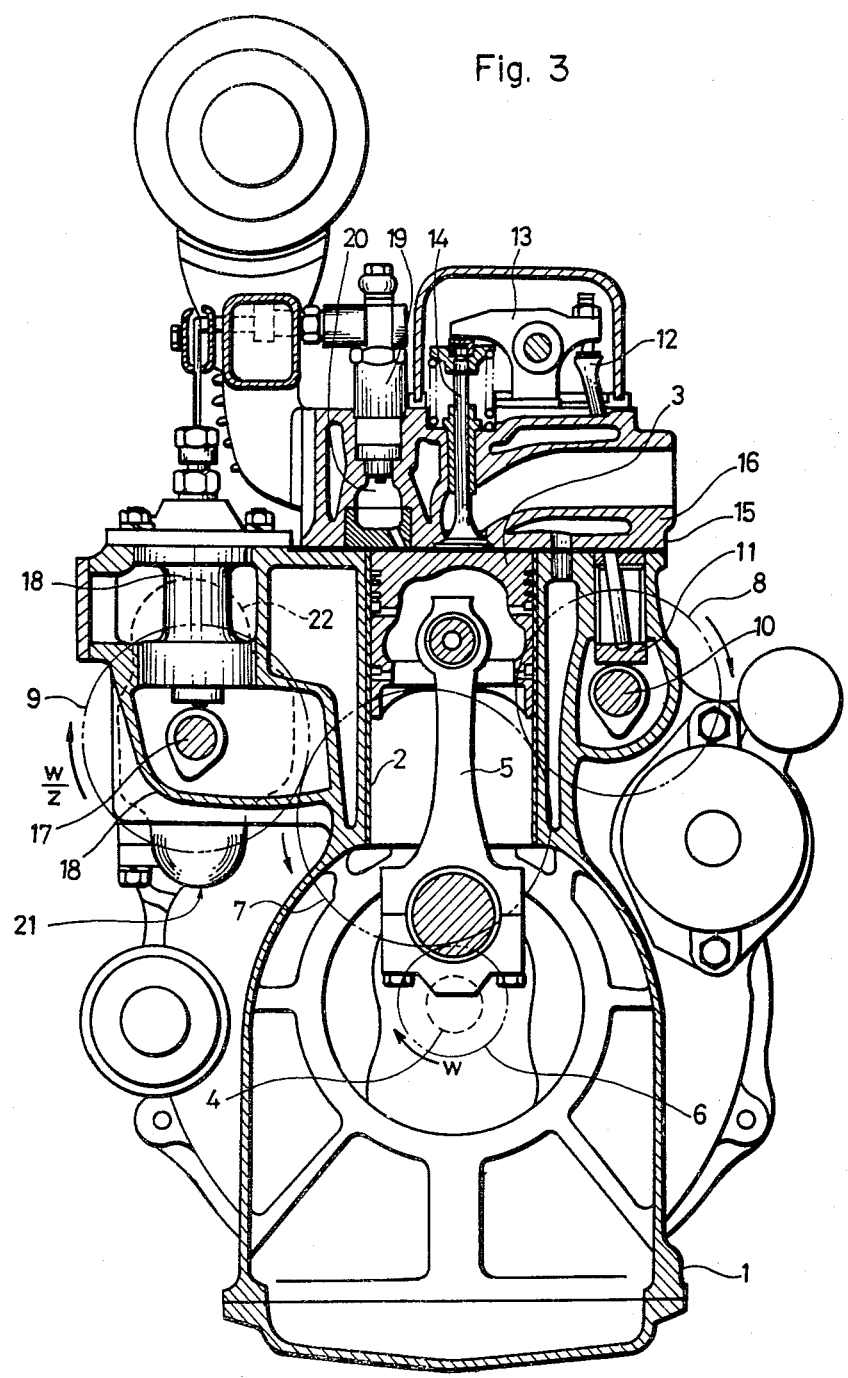
FIG. 3 is a longitudinal, sectional view taken through the engine of FIG. 1 showing the construction thereof, portions of the engine being illustrated in diagrammatic form.
Figure 4:
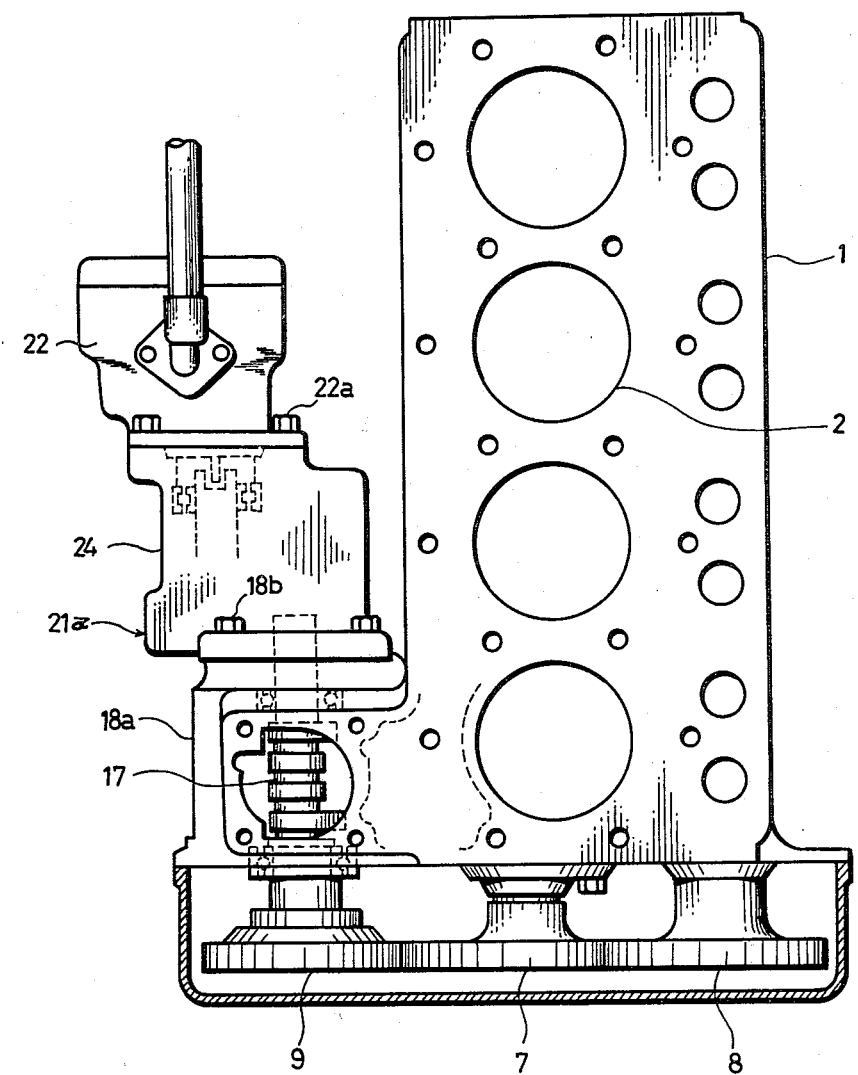
FIG. 4 is a top, plan view of the block of the engine of FIG. 3, with the head structure removed to show the cylinders and pistons, the fuel-injection camshaft, and the connecting driving gears.
Figure 5:
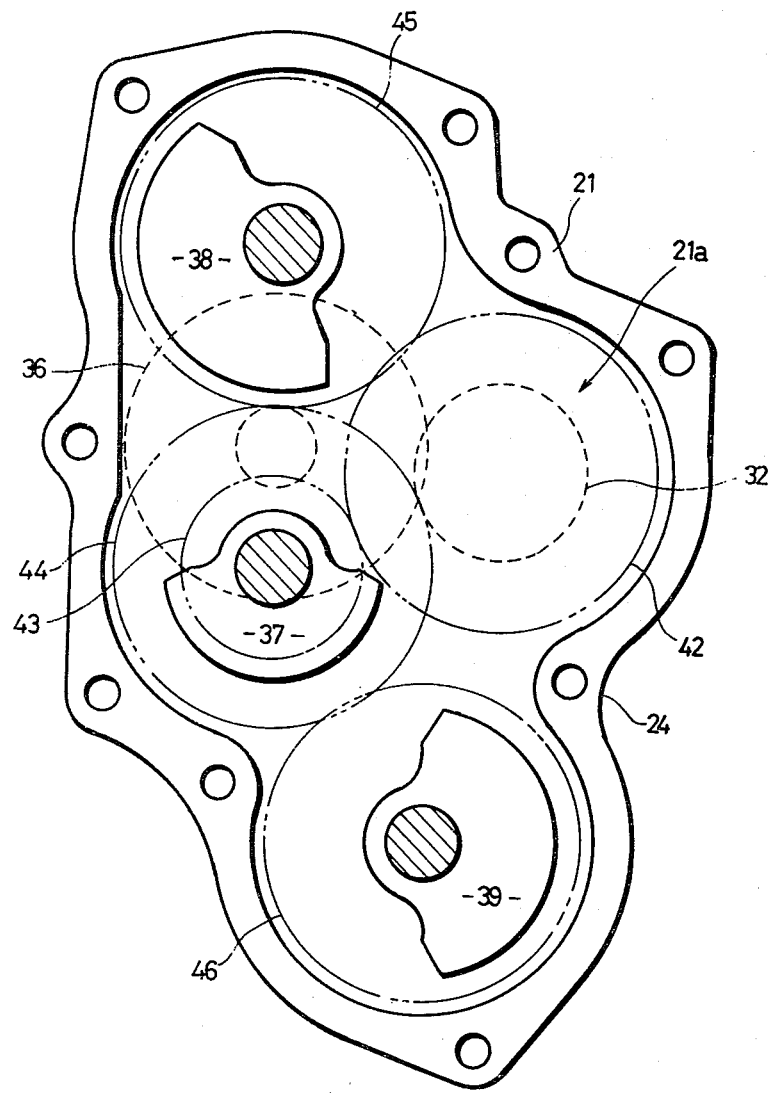
FIG. 5 is a rear, elevational view of the interior of the balancing device of FIG. 2, taken from the arrow V in FIG. 2.

In order to fully appreciate the importance of the invention, reference is first made to FIG. 12, which shows the prior art in engine balancing. In FIG. 12, the engine $E_p$ includes a crankshaft $4_p$ to which pistons $3_p$ are connected by connecting rods $5_p$. When the crankshaft $4_p$ is rotated, it will generate a vibration force $\vec{F_{rp}}$, which is shown directed along a vertical vibration line $S_p$ that passes through the vibrating force origin O on the centerline of the crankshaft $4_p$. In order to counteract the vibration force $\vec{F_{rp}}$, an engine balancing device $21_p$ is mounted to the bottom of the engine $E_p$ vertically beneath the centerline of the crankshaft $4_p$.

The balancing device $21_p$ is designed to generate a balancing force $\vec{F_{bp}}$ to cancel out the force $\vec{F_{rp}}$. If the device $21_p$ is located on the vibration line $S_p$ so that the force vector $\vec{F_{bp}}$ is aligned with the force $\vec{F_{rp}}$, it can function properly. If desired, an alternate location for the balancing device is shown in broken lines at $21_{p'}$. In this instance, the crankarms of the crankshaft $4_p$ are provided with 100% counterweights, so that the 1st harmonic component of vibrating force $\vec{F_{rp}}$ is directed horizontally, and the balancing force $\vec{F_{bp}}$, generated by the relocated device $21_{p'}$ is then effective to balance the vibrating force.

If the balancing device should be mounted in FIG. 12 so that the balancing force generated thereby is not in alignment either vertically or longitudinally with the origin O of the vibration force, then a problem is created. This is illustrated by the location of the balancing force vector $\vec{F_{bp''}}$ in FIG. 12, which is shown by broken lines and is spaced a distance $l_p$ from the vibration line $S_p$. In this circumstance, the vibrating force vector $\vec{F_{rp}}$ and the parallel balancing force vector $\vec{F_{bp''}}$ are separated by the distance $l_p$ with the result that a rotating moment $\vec{M_p}$ is generated, which places a new, undesirable force on the engine $E_p$. Heretofore, no effective arrangement has been known for counteracting this problem, and hence it has been the practice to locate the balancing device only on the vibration line $S_p$ so that the balancing force $\vec{F_{bp}}$ is in line with the vibrating force $\vec{F_{rp}}$.

In the past, if the creation of a rotating moment $\vec{M}$ was to be avoided, the locations for a balancing device in a reciprocating, vertical engine have essentially been limited to two. The first is a position beneath the crankshaft, as shown by the device $21_p$ in FIG. 12. The second location is to place the device in horizontal alignment with the crankshaft, as shown by the device $21_{p'}$ in FIG. 12; this arrangement requires counterweighting of the crankarms on the crankshaft, as has been noted. Both positions add to what are already the largest cross-sectional measurements of an engine, and thus increase the size of an already bulky assembly. The present invention provides a new balancing device which is free of these locational limitations, and which thus makes it possible to significantly reduce the overall dimensions of an internal combustion engine.

In the invention, the balancing device is mounted on the engine so that a balance force $\vec{F_b}$ is generated, spaced a certain distance l from the vibration line S. While this creates a rotating moment $\vec{M}$, the device of the invention is designed and arranged to also generate a balancing moment $-\vec{M}$. The result is that the balancing device of the invention can be located substantially anywhere on the engine, and advantage can be taken of unused spaces and recesses found about the typical engine to reduce overall engine size while at the same time counteracting vibration.

Figure 1:
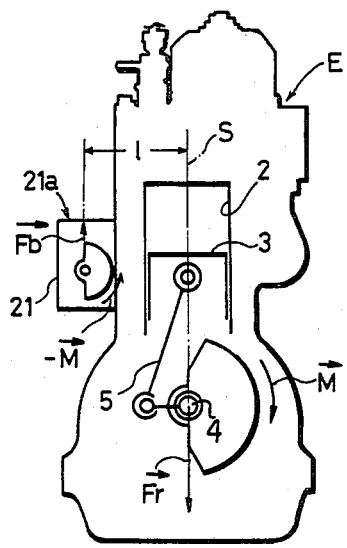
FIG. 1 is a cross-sectional, diagrammatic front view of a water-cooled, four-cylinder, four-cycle vertical diesel engine, illustrating the working mechanism of the balancing device of the invention.

Referring now to FIG. 1, a water-cooled, vertical four-cycle, four cylinder diesel engine is shown generally at E, and incorporates a crankshaft 4 having crankarms thereon to which connecting rods 5 are connected, the connecting rods 5 carrying pistons 3 which are reciprocally received in cylinders 2. The engine E generates a vibration force $\vec{F_r}$ when in operation, directed along a vibration line S that passes through the center of the crankshaft 4.

Mounted on the side of the engine E in a recessed space at a location above the main body of the engine is the balancing device 21 of the invention, including a balancing unit 21a which is constructed and arranged to generate both a balancing force $\vec{F_b}$ and a balancing moment $-\vec{M}$. Because the balancing force $\vec{F_b}$ is offset from the vibration line S by the distance l, the rotating moment $\vec{M}$ is generated; but such is balanced and canceled by the balancing moment $-\vec{M}$.

Turning now to FIGS. 2–7, the construction of the engine E and the balancing device 21 are shown in greater detail. The cylinders 2 are contained within the engine block 1, and the upper end of the engine block has a head assembly 16 bolted thereto with a gasket 15 interposed therebetween. The head assembly 16 contains combustion chambers 20, and explosion pressure generated by combustion of a fuel-air mixture within the combustion chamber flows into contact with the piston 2 and causes the crankshaft 4 to rotate.

When the crankshaft 4 is rotated a valve-moving camshaft 10 and a fuel-injection camshaft 17 rotate therewith, such rotation being effected by a drive gear 6 carried on the crankshaft 4 which engages gears 8 and 9 carried by the camshafts 10 and 17, respectively. The arrangement of the gears 6, 8 and 9 is such that the camshafts 10 and 17 are driven at one-half the rotating speed of the crankshaft 4.

The valve-moving camshaft 10 opens and closes intake and exhaust valves 14, through tappets 11, push rods 12 and rocker arms 13, in the usual manner. The fuel-injection camshaft 17 effects operation of a fuel-injection pump 18 mounted thereabove, to cause fuel to be injected into the combustion chambers 20. The fuel-injection pump 18 is housed in a casing 18a which is part of the engine block 1, the casing 18a being arranged to project laterally outwardly from the front end of the engine E.

The balancing unit 21a of the balancing device 21 and the engine's hydraulic pump 22 are both attached to the rear side of the fuel-injection pump casing 18a, in line therewith. This arrangement is particularly well shown in FIG. 4 and, by such, the hydraulic pump 22 and the balancing unit 21a are positioned in a location on the engine E where they do not add to the overall dimensions thereof. Both the hydraulic pump 22 and the balancing unit 21a are driven from the fuel-injection camshaft 17, and thus indirectly from the engine crankshaft 4.

Turning now to the balancing device 21, as has been described, such is designed both to cancel the nth component of the vibrating force $\vec{F_r}$ of the engine E, and to cancel the moment $\vec{M}$ generated because the balancing unit 21a is positioned a distance l from the engine's vibration line S. When working with a four-cycle, four-cylinder engine, the vibrating force $\vec{F_r}$ will typically have a number of harmonic components. Of these, the 2nd harmonic component is typically the largest and therefore the balancing device 21 of the invention will usually be designed to cancel the 2nd harmonic component of the vibrating force $\vec{F_r}$.

The balancing unit 21a of the balancing device includes a casing 24, one end of which is removably attached to the casing 18a of the fuel-injection pump 18 by bolts 18b. The hydraulic pump 22 is connected to the other end of the balancing unit casing with bolts 22a. Rotatably mounted within the casing 24 are three rotating balancers 37, 38 and 39, arranged so that their axes of rotation are parallel to each other, and parallel to the axis of rotation of the crankshaft 4. The center balancer 37 is placed between the upper and lower balancers 38 and 39, and the three balancers 37, 38 and 39 are interconnected by balancer gears 44, 45 and 46, respectively, arranged so that the center balancer 37 will rotate in a direction opposite to the upper and lower balancers 38 and 39. The balancer gears 44, 45 and 46 are of the same diameter, so that all three balancers will rotate at the same speed.

An intermediate shaft 32a is also mounted in the casing 24, and extends parallel to the balancer 37. The intermediate shaft 32a carries a small gear 32 and a large gear 42, the latter being in engagement with a small gear 43, carried on the center balancer 37. The outer end of the fuel-injection camshaft 17 carries a large drive gear 36 thereon, which meshes with the gear 32. Thus, a two-stage drive train is established for driving the three balancers 37, 38 and 39 from the fuel-injection camshaft 17, the sizes of the respective gears in the drive train being chosen so that the balancers 37, 38 and 39 are rotated at twice the speed of the engine crankshaft 4.

Figure 6:
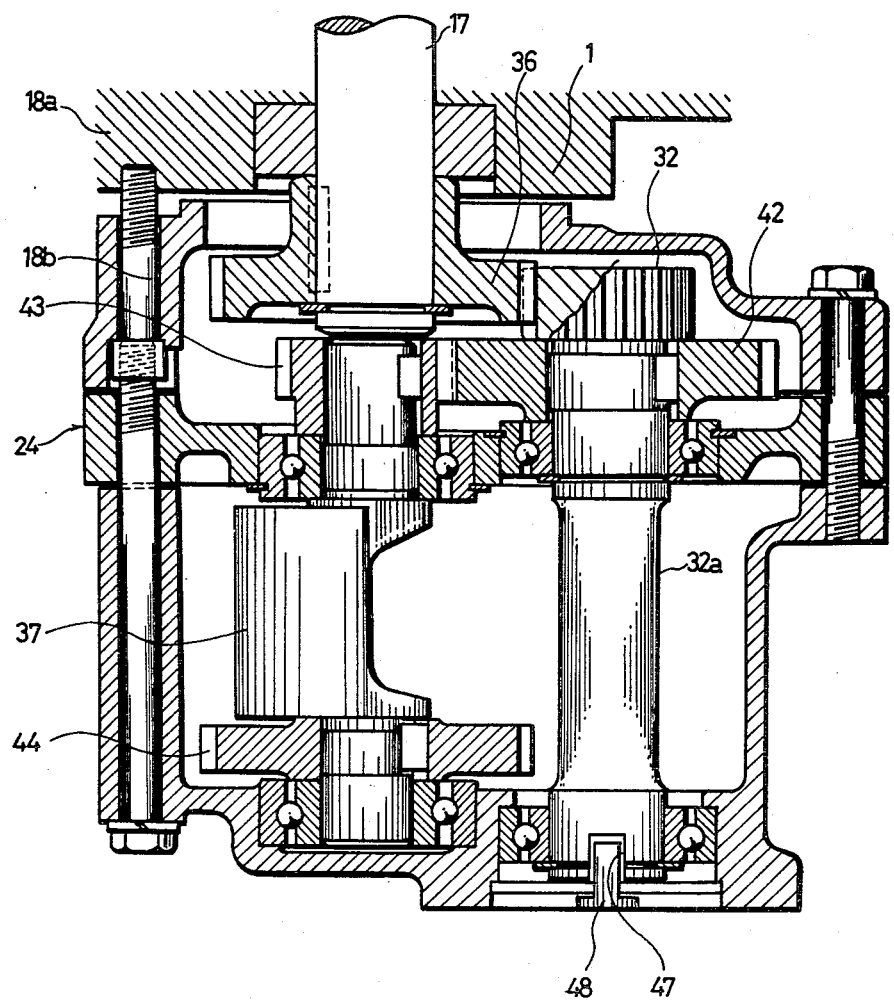
FIG. 6 is a horizontal, sectional view through the balancing device of the invention as shown in FIG. 5.
Figure 7:
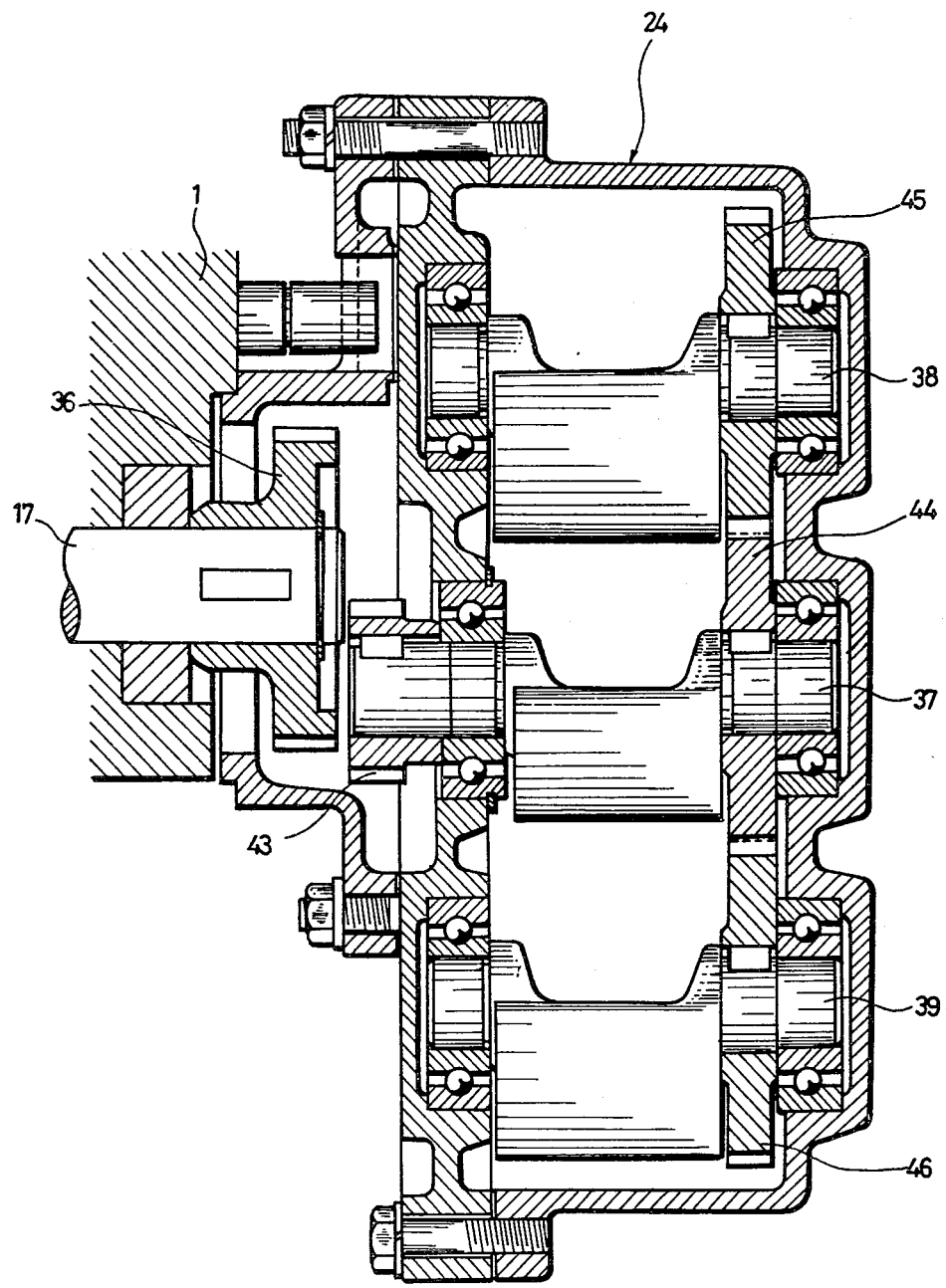
FIG. 7 is a vertical, sectional view through the balancing device of the invention as shown in FIG. 5.

The drive shaft 48 of the hydraulic pump 22 can be driven from one of the balancers 37, 38 or 39, or preferably from the intermediate shaft 32a, as shown in FIG. 6. A disengageable coupler element 47 is utilized to connect the pump drive shaft 48 to the intermediate shaft 32a.

Figure 10:
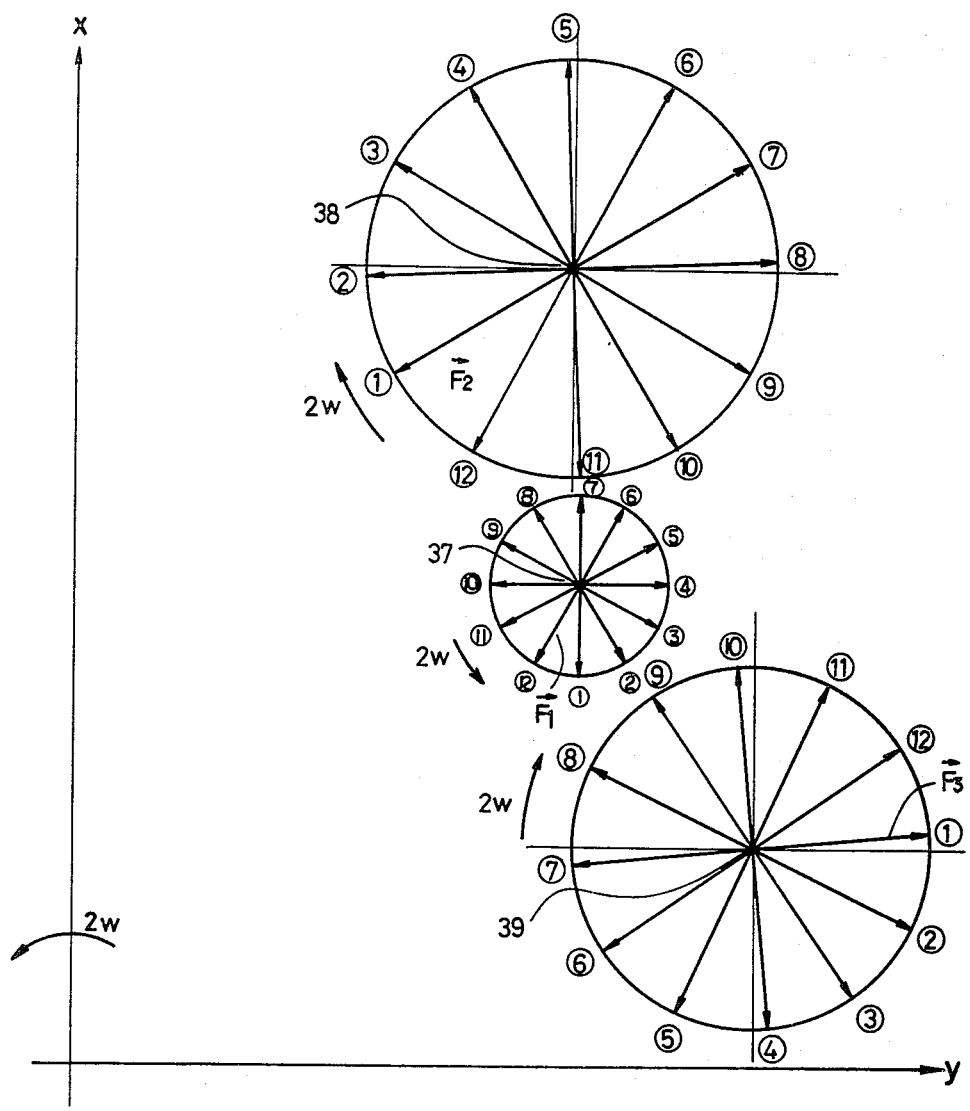
FIG. 10 is a vector analysis graph of the centrifugal force vectors generated by the balancing device of the invention, as applied to the engine of FIGS. 8 and 10, the balancing device being shown for 12 successive operating phases of the engine.

Referring now to the graphs of FIGS. 10 and 11, a brief explanation of the manner of operation of the balancing device 21 will be given. In FIG. 10 there is shown a vector analysis of the balancing device 21, drawn from the back side thereof as viewed in FIGS. 2 and 6. The vector analysis diagram of FIG. 10 shows balancing force vectors $\vec{F_1}$, $\vec{F_2}$ and $\vec{F_3}$, generated as centrifugal forces by the rotating balancers 37, 38 and 39, respectively. Note that in FIG. 10 the center balancer 37 is shown to be rotating in a direction opposite to the direction of rotation of the upper and lower balancers 38 and 39, as described earlier. The balancing force vector $\vec{F_1}$ generated by the center rotating balancer 37 is relatively small and rotates counterclockwise, whereas the balancing force vectors $\vec{F_2}$ and $\vec{F_3}$ generated by the balancers 38 and 39, respectively, are relatively large and rotate clockwise.

In FIG. 10, each of the vectors $\vec{F_1}$, $\vec{F_2}$ and $\vec{F_3}$ is associated with a symbol ①, which shows the initial phase when any selected piston 3 of the engine E is at its top dead point. The vectors each rotate continuously from the position ① to positions ②, ③, ④, ... ⑫, with a constant rotating speed. The resultant force of said vectors $\vec{F_1}$, $\vec{F_2}$ and $\vec{F_3}$ generate, taken as a whole, the balancing force $\vec{F_b}$ and the balancing moment $-\vec{M}$, as shown in FIG. 1 of the drawings. The balancing force $\vec{F_b}$ is established to cancel out the 2nd harmonic component of the vibrating force $\vec{F_r}$.

The balancing moment $-\vec{M}$ is generated by the three balancers 37, 38 and 39, and is spaced a distance l from the vibration line S passing through the origin of the vibrating force $\vec{F_r}$. The balancing force $\vec{F_b}$ is also spaced from the vibration line S by the distance l, which creates the rotating moment $\vec{M}$. By balancing the magnitude of the balancing moment $-\vec{M}$ with the rotating moment $\vec{M}$, the two moments are made to cancel out.

Figure 11:
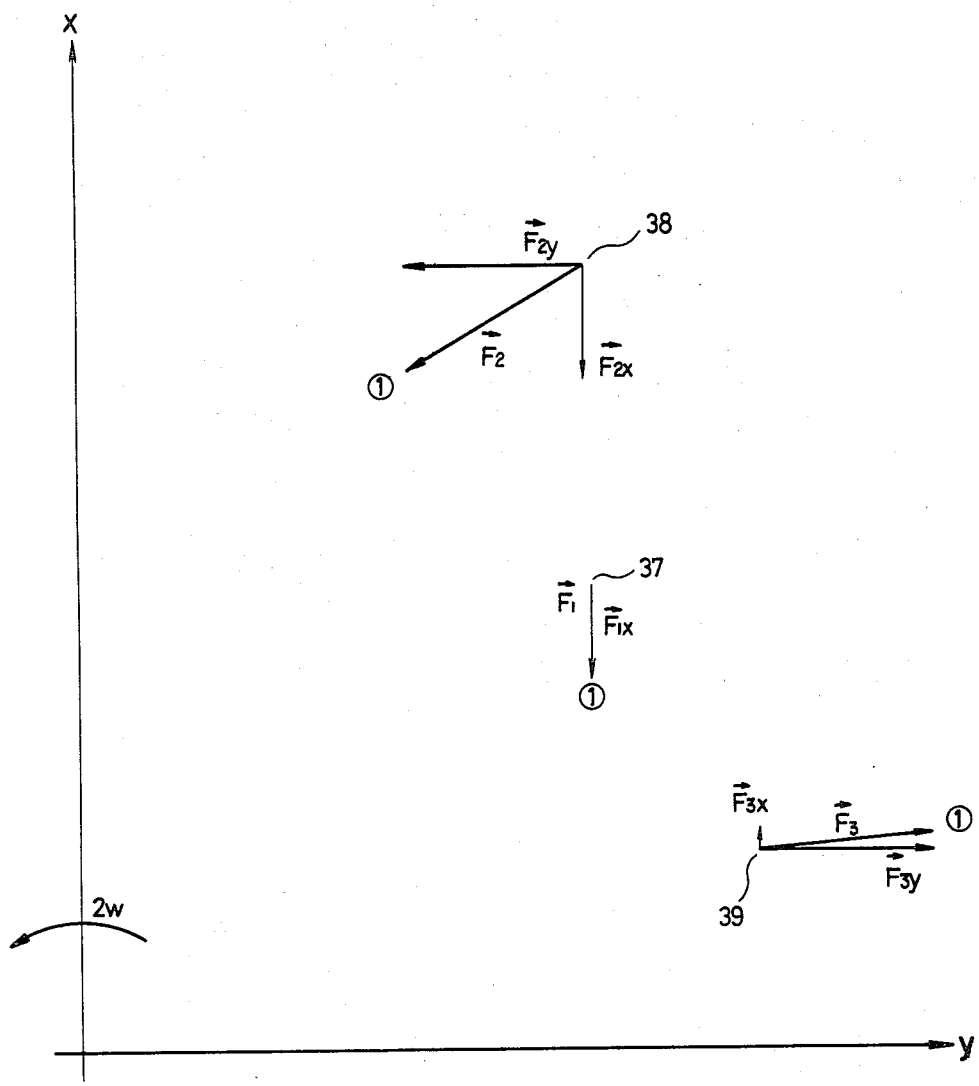
FIG. 11 is a graph of the centrifugal force vectors at phase 1 of operation, taken from FIG. 10.

Placing this brief explanation into mathematical expressions, and referring to FIGS. 10 and 11, the balancing device 21 is designed and arranged so that the vectors $\vec{F_1}$, $\vec{F_2}$ and $\vec{F_3}$ satisfy the following relationships:

$$(\vec{F_{1x}} + \vec{F_{2x}} + \vec{F_{3x}}) + \vec{F_r} = 0 \quad (1)$$

$$(\vec{F_{1y}} + \vec{F_{2y}} + \vec{F_{3y}}) = 0 \quad (2)$$

$$\vec{M_y} + \vec{M_x} = 0 \quad (3)$$

Wherein:
$\vec{F_{1x}}, \vec{F_{2x}}, \vec{F_{3x}}$ = The X direction component of $\vec{F_1}$, $\vec{F_2}$, $\vec{F_3}$
$\vec{F_{1y}}, \vec{F_{2y}}, \vec{F_{3y}}$ = The Y direction component of $\vec{F_1}$, $\vec{F_2}$, $\vec{F_3}$
$\vec{M_x}$ = The rotating moment generated by $\vec{F_{1x}}, \vec{F_{2x}}, \vec{F_{3x}}$
$\vec{M_y}$ = The rotating moment generated by $\vec{F_{1y}}, \vec{F_{2y}}, \vec{F_{3y}}$ Explaining relationships (1), (2) and (3) in reference to FIG. 1, $\vec{M_x}$ equates to the rotating moment $\vec{M}$, $\vec{M_y}$ equals $-\vec{M}$, and $\vec{F_{1x}} + \vec{F_{2x}} + \vec{F_{3x}}$ equates to the balancing force $F_b$.

Therefore, from the above expressions (1), (2) and (3):

$$\vec{F_b} + \vec{F_r} \neq 0$$
$$-\vec{M} + \vec{M} = 0$$

Consequently, it is seen that the vibrating force $\vec{F_r}$ and the rotating moment $\vec{M}$ are canceled by means of the balancing device 21, which is designed so that it can be attached to any eccentric position on the engine E.

In order to facilitate understanding and practice of the invention, a more detailed mathematical explanation thereof will now be offered. It is assumed that the balancing device 21 will be applied to a four-cycle, four-cylinder, in-line type engine.

Figure 8:
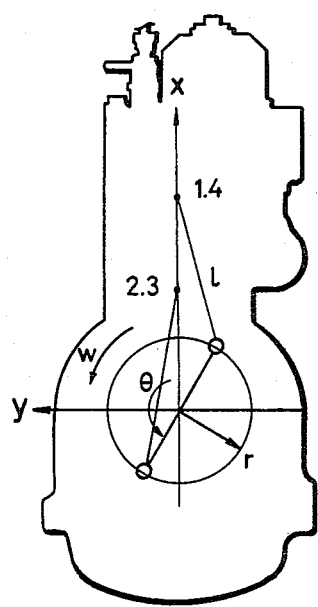
FIG. 8 is a diagrammatic view illustrating the vibration force generating mechanism occurring because of the piston and connecting rod movement in a four-cylinder vertical diesel engine.
Figure 9:
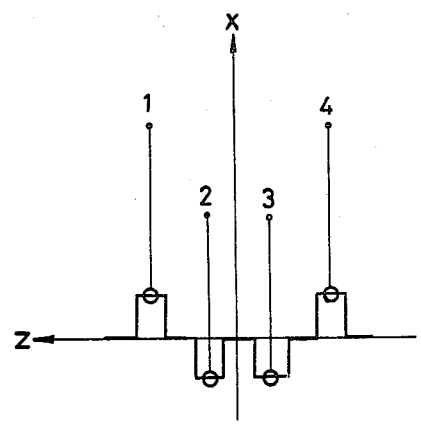
FIG. 9 is a diagrammatic side view of the engine of FIG. 8.

Referring now to FIGS. 8 and 9, the vibrating force $\vec{F}_r$ generated by the reciprocating inertia force in such an engine is as follows:

$$\vec{F}_r = F_x \cdot \vec{e_x} + F_y \cdot \vec{e_y} + F_z \cdot \vec{e_z} \tag{4}$$

$$F_x = 4\, mrw^2\, (0 + A_2 \cos 2\theta + 0 + A_4 \cos 4\theta + \ldots) \tag{5}$$

$$F_y = 0 \tag{6}$$

$$F_z = 0 \tag{7}$$

Wherein:

$\vec{e_x}, \vec{e_y}, \vec{e_z}$ = The unit vector directing along the X, Y, and Z axes, respectively $F_x, F_y, F_z$ = The magnitude of the x, y, z, axes component of the force $\vec{F}_r$, respectively r = The crank radius m = The reciprocating mass for one cylinder $\theta$ = The crankshaft rotation angle from the top dead point of any piston w = The rotating speed of the crankshaft, which is in accord with the equation:

$$\theta = wt$$

t = Time l = The length of the connecting rod $A_i$ = The coefficient referring to the $i^{th}$ harmonic component of $\vec{F}_r/4\, mrw^2$; thus, $A_2 = \rho + \frac{1}{4}\rho^3 + 15/128\, \rho^5 + \ldots$ $A_4 = -\frac{1}{4}\rho^3 - 3/16\, \rho^5 + \ldots$ $\rho = r/l$ It is known that the 4th and higher harmonic components of the vibration force $\vec{F}_r$ are equal to or less than 1/30 of the 2nd harmonic component. Therefore, in this instance, only the 2nd harmonic component is picked out and canceled by the balancing device 21 of the invention. And thus:

$$(\vec{F}_r)_2 = F_{rx} \cdot \cos 2\theta \cdot \vec{e_x} \tag{8}$$

Wherein:

$(\vec{F}_r)_2$ = The said 2nd harmonic component of $\vec{F}_r$ $F_{rx} = 4mrw^2(\rho + \frac{1}{4}\rho^3 + 15/128\, \rho^5 + \ldots)$ Referring to the centrifugal forces generated by the device 21 and the rotating moment generated by its rotating balancers:

$$\vec{R}_i = x_i \cdot \vec{e_x} + y_i \cdot \vec{e_y} \tag{9}$$

Wherein:

$\vec{R}_i$ = The symbol showing the position of No. i rotating balancer axle, that is, the displacement vector $x_i, y_i$ = The magnitude of the x, y components of the vector $\vec{R}_i$, respectively i = 1, 2, 3, ... N N = The total number of rotating balancers included in the balancing device It was stated earlier that in the invention the rotating balancers 37, 38 and 39 are to be rotated at double the rotating speed of the crankshaft 4. With this assumption, then the resultant centrifugal force vector $\vec{F}_i$ is obtained as follows:

$$\vec{F}_i = F_{Bi} [\cos 2(\theta + \alpha_i) \cdot \vec{e_x} + \sin 2k_i(\theta + \alpha_i) \cdot \vec{e_y}] \tag{10}$$

Wherein:

$\vec{F}_i$ = The centrifugal force vector generated by the No. i rotating balancer, that is, No. i balancing force vector $F_{Bi} = 4 m_{Bi} \cdot r_{Bi} \cdot w^2$, in which:

$m_{Bi}$ = The eccentric mass of said No. i rotating balancer $r_{Bi}$ = The eccentric radius of said $m_{Bi}$ $\alpha_i$ = The initial phase of said No. i rotating balancer $k_i$ = The symbol showing the rotating direction of said No. i rotating balancer, defined in the right-hand coordinate system as follows:

when the rotating direction is plus, $k_i = +1$ when the rotating direction is minus, $k_i = -1$ $\theta$, w and t = As described hereinbefore Thus, the resultant balancing force of said $F_i$ is calculated as follows:

$$(\vec{F}_B)_2 = \sum_{i=1}^{N} \vec{F}_i = (F_{xc} \cdot \cos 2\theta + F_{xs} \cdot \sin 2\theta) \cdot \vec{e_x} + (F_{yc} \cdot \cos 2\theta + F_{ys} \cdot \sin 2\theta) \cdot \vec{e_y} \tag{11}$$

Wherein:

$F_{xc} = \sum_{i=1}^{N} x_{ci}$, with $x_{ci} = F_{Bi} \cdot \cos 2\alpha_i$ $F_{xs} = -\sum_{i=1}^{N} x_{si}$, with $x_{si} = F_{Bi} \cdot \sin 2\alpha_i$ $F_{yc} = \sum_{i=1}^{N} k_i \cdot x_{si}$ $F_{ys} = \sum_{i=1}^{N} k_i \cdot x_{ci}$ The resultant rotating moment generated by all of the rotating balancers is calculated as follows:

$$(\vec{M})_2 = \sum_{i=1}^{N} (\vec{R}_i \times \vec{F}_i) \tag{12}$$

$$= (M_{Bc} \cdot \cos 2\theta + M_{Bs} \cdot \sin 2\theta) \cdot \vec{e_z}$$

Wherein:

$M_{Bc} = \sum_{i=1}^{N} (k_i \cdot x_i \cdot x_{si} - y_i \cdot x_{ci})$ $M_{Bs} = \sum_{i=1}^{N} (k_i \cdot x_i \cdot x_{ci} + y_i \cdot x_{si})$ In order to cancel the vibrating force $\vec{F}_r$, the balancing device 21 must be designed to satisfy the following relationships:

I. Generate a balancing force $(\vec{F}_B)_n$ which cancels the vibrating force $(\vec{F}_r)_n$ caused by the piston and crank mechanism of the engine E; and II. The rotating moment $(\vec{M})_n$ caused by $(\vec{F}_r)_n$ and $(\vec{F}_B)_n$ must be equal to zero, that is, the sum of the rotating moments around the crankshaft 4 must be equal to zero, which rotating moments are generated by centrifugal forces of the rotating balancers.

In relationships I and II, the symbol n of $(\ )_n$ shows the nth harmonic component, and in the preferred embodiment n equals 2. The two relationships I and II can be expressed mathematically as follows:

$$(\vec{F}_B)_2 = \sum_{i=1}^{N} \vec{F}_i = -(\vec{F}_r)_2 \qquad \text{I.}$$

$$(\vec{M})_2 = 0 \qquad \text{II.}$$

If equations (8), (11) and (12) are now applied to equations I and II, the following results:

$$(F_{xc}\cos 2\theta + F_{xs}\sin 2\theta)\vec{e_x} + (F_{yc}\cos 2\theta + F_{ys}\sin 2\theta)\vec{e_y} = -F_{rx}\cos 2\theta \cdot \vec{e_x} \quad (13)$$

$$(M_{Bc}\cos 2\theta + M_{Bs}\sin 2\theta)\vec{e_z} = 0 \quad (14)$$

Therefore:

$$\begin{aligned} F_{xc} &= -F_{rx} \\ F_{xs} &= 0 \\ F_{yc} &= 0 \\ F_{ys} &= 0 \\ M_{Bc} &= 0 \\ M_{Bs} &= 0 \end{aligned} \quad (15)$$

and:

$$F_{rx} = 4\,mrw^2(\rho + \tfrac{1}{4}\rho^3 + 15/128\rho^5...) \quad (16)$$

$$F_{xc} = \sum_{i=1}^{N} x_{ci}$$

$$F_{xs} = -\sum_{i=1}^{N} x_{si}$$

$$F_{yc} = \sum_{i=1}^{N} k_i \cdot x_{si}$$

$$F_{ys} = \sum_{i=1}^{N} k_i \cdot x_{ci}$$

$$M_{Bc} = \sum_{i=1}^{N} (k_i \cdot x_i \cdot x_{si} - y_i \cdot x_{ci})$$

$$M_{Bs} = \sum_{i=1}^{N} (k_i \cdot x_i \cdot x_{ci} + y_i \cdot x_{si})$$

For the relationships set forth in (16), and recognizing the position $(x_i, y_i)$ of the rotating balancers as known, $x_{ci}$ and $x_{si}$ can be calculated by solving a 2N dimensional simple simultaneous equation obtained from the expressions of (15).

Utilizing expression (11), $x_{ci}$, $x_{si}$ and $F_{Bi}$ are as follows:

$$x_{ci} = F_{Bi} \cos 2\alpha_i$$

$$x_{si} = F_{Bi} \sin 2\alpha_i$$

$$F_{Bi} = 4 \cdot m_{Bi} \cdot r_{Bi} \cdot w^2$$

Therefore, the attached moment (i.e., $M_{Bi} \cdot r_{Bi} = F_{Bi}/4w^2$) and the initial phases (i.e., $2\alpha_i$) of each of the rotating balancers can be calculated from $x_{ci}$ and $x_{si}$. Consequently, it is possible to determine the attached moment $m_{Bi} \cdot r_{Bi}$ and the initial phase $2\alpha_i$ of the rotating balancers satisfying the conditions I and II, described earlier, consisting of N rotating axles, with each of them being attached to any position of the engine E.

The reason for the number of rotating balancers 37, 38 and 39 being three or more in the preferred embodiment of the invention is as follows. In order to generate a balancing force $\vec{F_b}$ that will cancel the vibrating force $\vec{F_r}$, fundamentally two rotating balancers would be enough. And in order to generate a balancing moment $-\vec{M}$ to cancel the rotating moment $\vec{M}$, it would fundamentally be enough to arrange these two rotating balancers separately in their upper and lower positions.

However, if this is done, the phase of the balancing moment $-\vec{M}$ loses $\tfrac{1}{8}$ of a cycle (i.e., 45° of angle in the case of the illustrated preferred embodiment) from the rotating moment $\vec{M}$. In order to modify this phase delay, one or more rotating balancers must be added to the basic two. Three balancers will usually suffice, as shown in the drawings.

Using the concepts and principles set out herein, it is possible to determine the value of the balancing force $\vec{F_b}$ so that the balancing moment $-\vec{M}$ generated by the balancing force $\vec{F_b}$ in the device of the invention can cancel both the resultant rotating moment of the rotating moment $\vec{M}$, and the rolling moment $-\vec{M_o}$ inherent in the reciprocating engine E. Further, should it be desired to cancel the 1st harmonic component of the vibrating force $\vec{F_r}$, one of the rotating balancers 37, 38 or 39 can be fixed in the crankshaft 4.

It has also been found that under the condition wherein the respective rotating center axis of the rotating balancers 37, 38 and 39 is normal to an imaginary plane including the vibration line S, the rotating balancers 37, 38 and 39 directing in any direction can be attached to such locations on the engine E as the front, back, oblique front and oblique back thereof. The engine E can also be changed from a four-cylinder engine to a multi-cylinder or a single-cylinder engine.

Returning again to the N harmonic components of the vibrating force $\vec{F_r}$, it is to be understood that the balancing device 21 can be designed to cancel the 1st harmonic component or any one of the 3rd and higher components, if it so desired, utilizing the concepts and principles as set forth herein. The balancing device 21 can also be applied to existing internal combustion engines, without requiring replacement or exchange of crankcases or oil pans, and without major reconstruction of the engines.

It is thus seen that a balancing device has been provided which meets the objects hereinabove set forth, and which can be applied to nearly any location on an engine, particularly in recesses and cavities which are now unused. Obviously, additional modifications and variations of the invention are possible.

We claim:

1. A balancing device for attachment to a reciprocating, internal combustion engine for countering the vibrating force $\vec{F_r}$ generated during operation of the engine, said vibrating force $\vec{F_r}$ being directed along a vibration line S, said engine including an engine block having an enlarged crankcase portion in which is housed a crankshaft and a portion of smaller dimensions containing the engine cylinder(s), there being a recessed region adjacent the cylinder-containing portion of said engine block because of the smaller dimensions thereof compared to the crankcase portion of said engine block, and said balancing device comprising:

housing means mounted on said engine; and balancing means mounted within said housing means, constructed and arranged to generate a selected balancing force $\vec{F_b}$ and a selected balancing moment $-\vec{M}$;

said balancing force $\vec{F_b}$ being chosen to cancel the nth harmonic component of said engine vibrating force $\vec{F_r}$, and said housing means being positioned on said engine within said recessed region adjacent the cylinder-containing portion of said engine block so that said balancing force $\vec{F_b}$ is spaced a distance l from said vibration line S passing through the origin of said vibrating force $\vec{F_r}$;

said distance l between said balancing force $\vec{F_b}$ and said vibrating force $\vec{F_r}$ resulting in the generation of a rotating moment $\vec{M}$; and said balancing moment $-\vec{M}$ being chosen to cancel said rotating moment $\vec{M}$.

2. A balancing device as recited in claim 1, wherein said balancer means comprises:
a set of three or more rotating balancers separate from said crankshaft, each of said rotating balancers having an axis of rotation extending normal to an imaginary plane including said vibration line S, and all of said rotating balancers being mounted within said housing means and being spaced from said crankshaft;
at least one of said rotating balancers being arranged to rotate in a direction reverse that of the others of said rotating balancers; and
drive means connecting said rotating balancers with the crankshaft of said engine, to be driven thereby.

3. A balancing device as recited in claims 1 or 2, wherein said balancing device is detachably mounted on said engine.

4. A balancing device as recited in claims 1 or 2, wherein said balancing moment $-\vec{M}$ is chosen to cancel both the resultant rotating moment of said rotating moment $\vec{M}$, and the rolling moment $\vec{M}_o$ inherent in said engine.

5. A balancing device as recited in claim 2, wherein said drive means comprises meshed gears, arranged to be driven by the rotation of said crankshaft.

6. A balancing device for attachment to a reciprocating, internal combustion engine for countering the vibrating force $F_r$ generated during operation of the engine, said vibrating force $F_r$ being directed along a vibration line S, said engine including an engine block having a crankshaft mounted therein, said fuel pump means mounted on said engine block and including a camshaft mounted within said casing and driven from said engine crankshaft, said balancing device comprising:
housing means attached to said fuel pump means casing; and
balancer means mounted within said housing means, constructed and arranged to generate a selected balancing force $\vec{F_b}$ and a selected balancing moment $-\vec{M}$;
said balancing force $\vec{F_b}$ being chosen to cancel the nth harmonic component of said engine vibrating force $\vec{F_r}$, and said housing means being positioned on said engine so that said balancing force $\vec{F_b}$ is spaced a distance 1 from said vibration line S passing through the origin of said vibrating force $\vec{F_r}$;
said distance 1 between said balancing force $\vec{F_b}$ and said vibrating force $\vec{F_r}$ resulting in the generation of a rotating moment $\vec{M}$; and
said balancing moment $-\vec{M}$ being chosen to cancel said rotating moment $\vec{M}$;
said balancer means comprising:
a set of three or more rotating balancers, each of said rotating balancers having an axis of rotation extending normal to an imaginary plane including said vibration line S, and all of said rotating balancers being mounted within said housing means;
at least one of said rotating balancers being arranged to rotate in a direction reverse that of the others of said rotating balancers; and
drive means connecting said rotating balancers with said fuel pump means camshaft, whereby said rotating balancers are driven indirectly from said crankshaft through said camshaft.

7. A balancing device as recited in claim 8, wherein said drive means comprises meshed gears, arranged to be driven by the rotation of said crankshaft.

8. A balancing device as recited in claim 6, wherein there are three rotating balancers, and the middle one of said rotating balancers rotates in a direction opposite to the other two thereof.

* * * * *